US012713999B2

(12) United States Patent
Glovier

(10) Patent No.: US 12,713,999 B2
(45) Date of Patent: Aug. 25, 2026

(54) SYSTEM AND METHOD FOR MONITORING PLUGGING OF BASKET ASSEMBLIES OF AN AGRICULTURAL IMPLEMENT

(71) Applicant: CNH Industrial America LLC, New Holland, PA (US)

(72) Inventor: Scott Glovier, Lombard, IL (US)

(73) Assignee: CNH Industrial America LLC, New Holland, PA (US)

(*) Notice: Subject to any disclaimer, the term of this patent is extended or adjusted under 35 U.S.C. 154(b) by 703 days.

(21) Appl. No.: 18/108,266

(22) Filed: Feb. 10, 2023

(65) Prior Publication Data

US 2024/0268250 A1 Aug. 15, 2024

(51) Int. Cl.

*A01B 79/00* (2006.01)
*A01B 29/04* (2006.01)
*A01B 63/24* (2006.01)
*A01B 49/02* (2006.01)

(52) U.S. Cl.

CPC ............ *A01B 79/00* (2013.01); *A01B 29/048* (2013.01); *A01B 63/24* (2013.01); *A01B 49/027* (2013.01)

(58) Field of Classification Search

CPC ....... A01B 29/048; A01B 63/24; A01B 79/00; A01B 79/005; A01B 49/027; A01B 71/08
USPC .......................................................... 172/518
See application file for complete search history.

(56) References Cited

U.S. PATENT DOCUMENTS 6,834,550 B2 12/2004 Upadhyaya et al.
7,354,341 B1 * 4/2008 Smith .................. A01D 41/127 460/4
10,182,693 B2 1/2019 Landry et al.
11,202,402 B2 12/2021 Glovier
11,369,052 B2 6/2022 Cozza et al.
(Continued)

FOREIGN PATENT DOCUMENTS

CN 205027322 U 2/2016
EP 2668469 B1 4/2017
(Continued)

OTHER PUBLICATIONS

G.G. Peteinatos et al. "Precision harrowing with a flexible tine harrow and an ultrasonic sensor" ResearchGate Conference Paper Jul. 2015 Precision agriculture '15 (9 pages) https://www.wageningenacademic.com/doi/abs/10.3920/978-90-8686-814-8_72.

*Primary Examiner* — Christopher J Sebesta
*Assistant Examiner* — Audrey L Lusk
(74) *Attorney, Agent, or Firm* — Dority & Manning, P.A.

(57) ABSTRACT

An agricultural implement includes a basket assembly configured to roll relative to a surface of a field as the agricultural implement travels across the field. The basket assembly, in turn, includes a plurality of bars spaced circumferentially about an outer perimeter of the basket assembly. Furthermore, the agricultural implement includes an ultrasonic sensor configured to emit ultrasonic signals directed at the basket assembly and receive return signals based on reflections of the ultrasonic signals off of the basket assembly. Additionally, the agricultural implement includes a computing system communicatively coupled to the ultrasonic sensor. In this respect, the computing system is configured to determine when the basket assembly is plugged based on at least one of the return signals being received by the ultrasonic sensor or a lack of return signals being received by the ultrasonic sensor for an agricultural implement.

13 Claims, 7 Drawing Sheets

(56) References Cited

U.S. PATENT DOCUMENTS

| | | | | |
|---|---|---|---|---|
| 11,589,494 | B2 | 2/2023 | Smith et al. | |
| 2018/0310465 | A1 | 11/2018 | Peterson et al. | |
| 2019/0008088 | A1 | 1/2019 | Posselius et al. | |
| 2019/0110394 | A1* | 4/2019 | VanNahmen | A01D 34/006 |
| 2020/0128719 | A1* | 4/2020 | Harmon | A01B 63/008 |
| 2020/0305335 | A1* | 10/2020 | Schoeny | A01B 71/08 |
| 2021/0045274 | A1* | 2/2021 | Cozza | A01B 49/027 |
| 2021/0329838 | A1* | 10/2021 | Zielke | A01D 45/021 |

FOREIGN PATENT DOCUMENTS

| | | | |
|---|---|---|---|
| EP | 3335532 | A1 | 6/2018 |
| WO | WO 2002/049414 | | 6/2002 |
| WO | WO 2017/158006 | | 9/2017 |

* cited by examiner

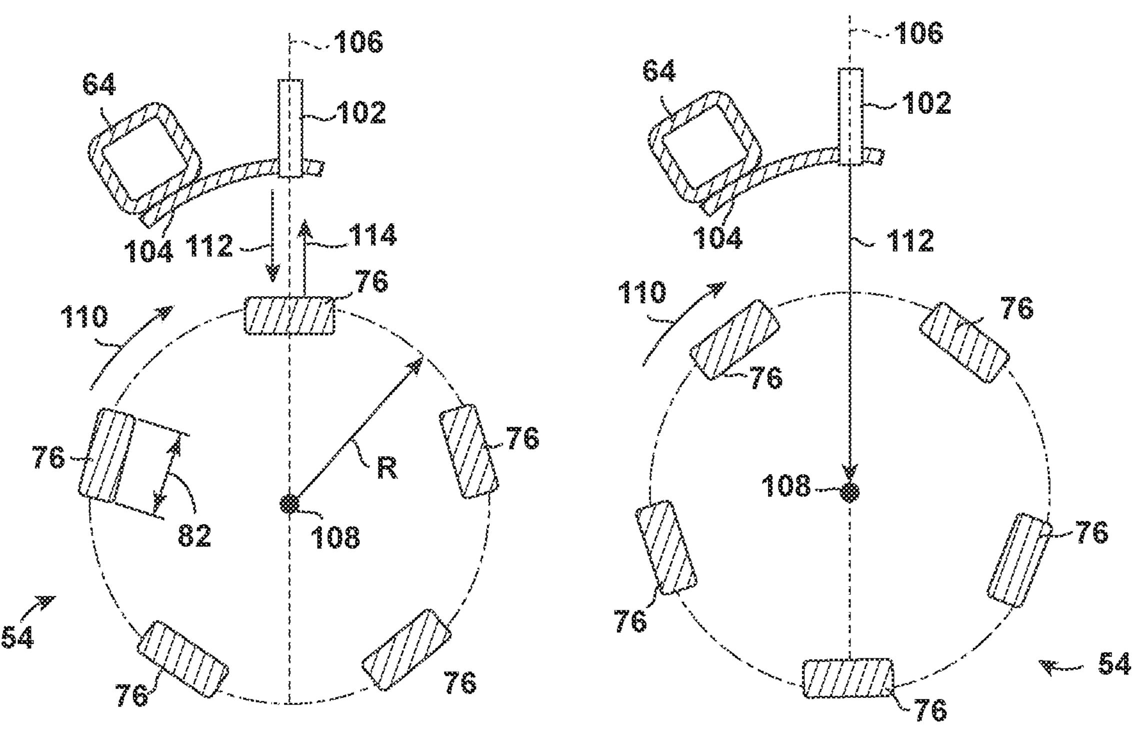
106
64
102
104
112
114
76
110
R
76
82
108
54
FIG. 4A
106
64
102
104
112
110
76
108
54
FIG. 4B
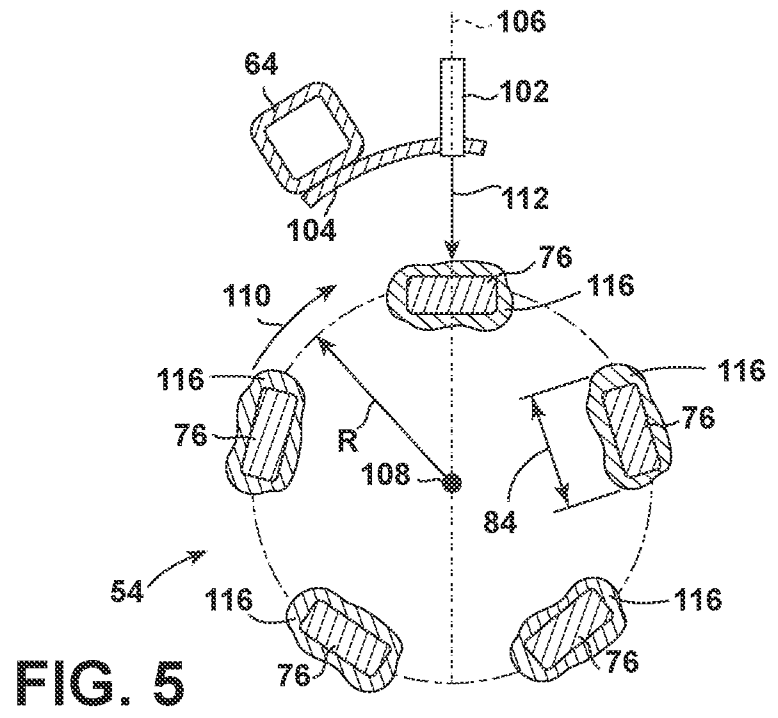
106
64
102
104
112
76
116
110
R
108
84
54
FIG. 5

SYSTEM AND METHOD FOR MONITORING PLUGGING OF BASKET ASSEMBLIES OF AN AGRICULTURAL IMPLEMENT

FIELD OF THE INVENTION

The present disclosure generally relates to agricultural implements and, more particularly, to systems and methods for monitoring plugging of rolling basket assemblies of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground-engaging tools configured to engage the soil as the implement is moved across the field. For example, in certain configurations, the implement may include one or more harrow disks, leveling disks, rolling baskets, shanks, tines, and/or the like. Such ground-engaging tool(s) loosen, agitate, and/or otherwise work the soil to prepare the field for subsequent planting operations.

During tillage operations, field materials, such as residue, soil, rocks, mud, and/or the like, may become trapped or otherwise accumulate on and/or within ground-engaging tools or between adjacent ground-engaging tools. For instance, material accumulation will often occur around the exterior of a basket assembly (e.g., on the blades or bars of the basket assembly) and/or within the interior of the basket assembly. Such accumulation of field materials may prevent the basket assembly from performing in a desired manner during the performance of a tillage operation. In such instances, it is often necessary for the operator to take certain corrective actions to remove the material accumulation. However, it is typically difficult for the operator to detect or determine a plugged condition of a basket assembly when viewing the tools from the operator's cab.

Accordingly, an improved system and method for monitoring plugging of basket assemblies of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement includes a frame and a basket assembly supported on the frame such that the basket assembly is configured to roll relative to a surface of a field as the agricultural implement travels across the field. The basket assembly, in turn, includes a plurality of bars spaced circumferentially about an outer perimeter of the basket assembly. Furthermore, the agricultural implement includes an ultrasonic sensor configured to emit ultrasonic signals directed at the basket assembly and receive return signals based on reflections of the ultrasonic signals off of the basket assembly. Additionally, the agricultural implement includes a computing system communicatively coupled to the ultrasonic sensor. In this respect, the computing system is configured to determine when the basket assembly is plugged based on at least one of the return signals being received by the ultrasonic sensor or a lack of return signals being received by the ultrasonic sensor.

In another aspect, the present subject matter is directed to a system for monitoring basket plugging of an agricultural implement. The system includes a basket assembly configured to roll relative to a surface of a field as the agricultural implement travels across the field. The basket assembly, in turn, includes a plurality of bars spaced circumferentially about an outer perimeter of the basket assembly. Moreover, the system includes an ultrasonic sensor configured to emit ultrasonic signals directed at the basket assembly and receive return signals based on reflections of the ultrasonic signals off of the basket assembly. In addition, the system includes a computing system communicatively coupled to the ultrasonic sensor. In this respect, the computing system is configured to determine when the basket assembly is plugged based on at least one of the return signals being received by the ultrasonic sensor or a lack of return signals being received by the ultrasonic sensor.

In a further aspect, the present subject matter is directed to a method for monitoring basket plugging of an agricultural implement. The agricultural implement, in turn, includes a basket assembly configured to roll relative to a surface of a field as the agricultural implement travels across the field, with the basket assembly including a plurality of bars spaced circumferentially about an outer perimeter of the basket assembly. The method includes receiving, a computing system, sensor data from an ultrasonic sensor configured to emit ultrasonic signals directed at the basket assembly and receive return signals based on reflections of the ultrasonic signals off of the basket assembly. Furthermore, the method includes determining, with the computing system, when a lack of return signals being received by the ultrasonic sensor occurs based on the received sensor data. Additionally, the method includes determining, with the computing system, that the basket assembly is plugged when the lack of return signals being received by the ultrasonic sensor occurs. Moreover, the method includes initiating, with the computing system, a control action associated with de-plugging the basket assembly when it is determined that the basket assembly is plugged.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIGS. 4A and 4B illustrate simplified cross-sectional views of one of the basket assemblies shown in FIG. 3 when such basket assembly does not have field materials accumulated thereon in accordance with aspects of the present subject matter:

FIG. 5 illustrates similar simplified cross-sectional view of the basket assembly shown in FIGS. 4A and 4B, but with the basket assembly now having field materials accumulated thereon in accordance with aspects of the present subject matter:

Figure 1:
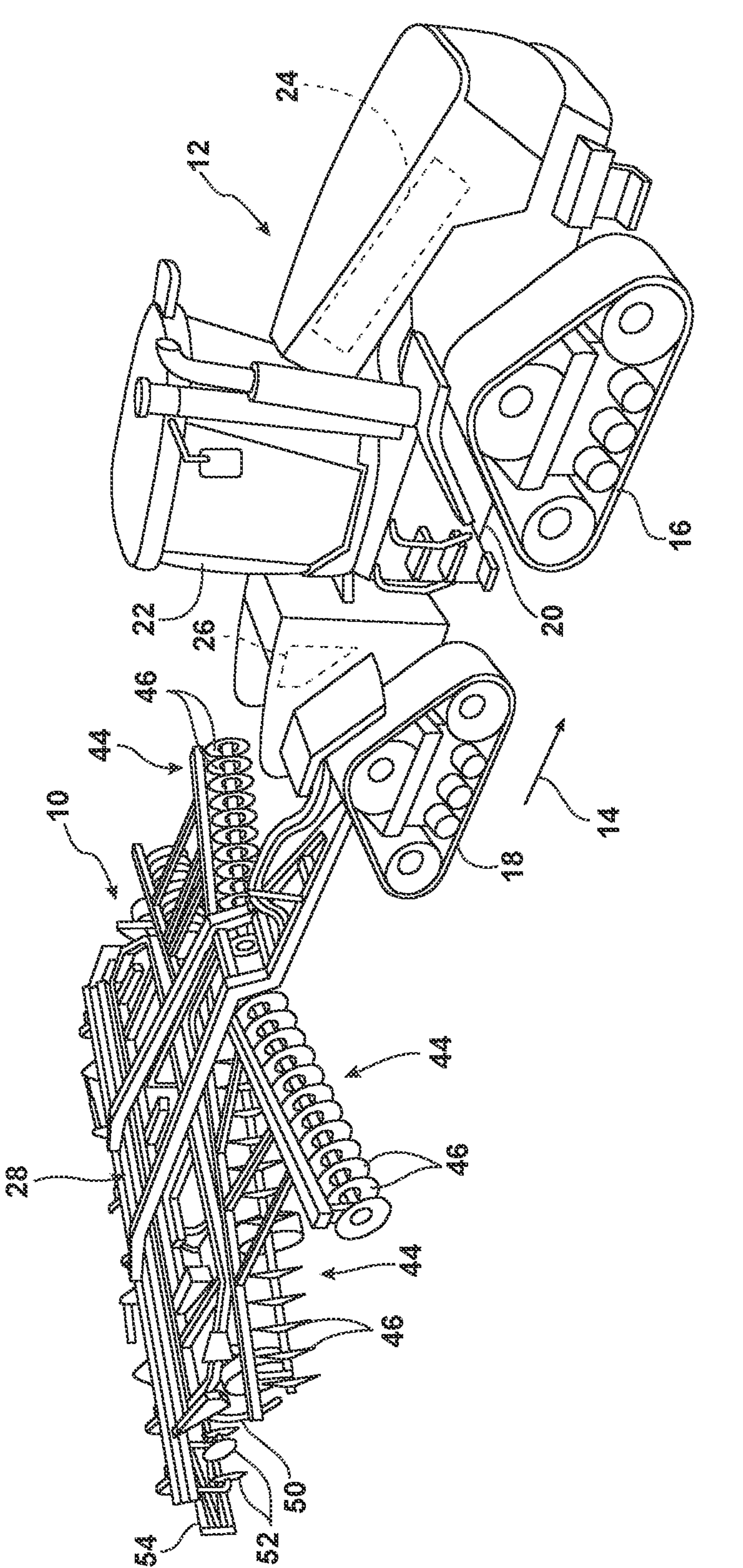
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for monitoring basket plugging of an agricultural implement. As will be described below; the agricultural implement includes a basket assembly configured to roll relative to the surface of a field as the implement travels across the field. The basket assembly, in turn, includes a plurality of bars spaced circumferentially about the outer perimeter of the basket assembly. In this respect, as the basket assembly rolls relative to the field surface, the bars engage the soil to break up soil clods present on the surface. However, when a sufficient amount of field materials (e.g., soil, rocks, mud, residue, etc.) accumulates on and/or within the basket assembly, its operation may be impacted. In such instances, the basket assembly is considered plugged.

In several embodiments, a computing system of the disclosed system is configured to determine when the basket assembly is plugged using one or more ultrasonic sensors. Specifically, in such embodiments, each ultrasonic sensor is configured to emit ultrasonic signals directed at the basket assembly (e.g., a section of the basket assembly) and receive return signals based on reflections of the ultrasonic signals off of the basket assembly. Furthermore, the computing system is configured to determine when the basket assembly is plugged based on the return signals being received by the ultrasonic sensor(s) and/or a lack of return signals being received by the ultrasonic sensor(s). For example, when the ultrasonic sensor(s) receives the return signals, the computing system may determine that the basket assembly is not plugged. Conversely, when there is a lack of return signals being received by the ultrasonic sensor(s) for longer than a threshold time period, the computing system may determine that the basket assembly is plugged. Thereafter, when it is determined that the basket assembly is plugged, the computing system may initiate one or more control actions associated with de-plugging the basket assembly, such as adjusting the ground speed of the agricultural implement and/or the force being applied to the basket assembly.

Determining when a basket assembly of an agricultural implement is plugged based on whether an ultrasonic sensor (s) receives return signals provides early detection of plugging. More specifically, the metal bars of a basket assembly reflect ultrasonic signals. However, when a basket assembly begins to plug, the field materials first build up on the bars. Unlike the metal bars, the accumulated field materials absorb the ultrasonic signals such that the ultrasonic sensor (s) do not receive the return signals. In this respect, by monitoring for when there is a lack of return signals being received by the ultrasonic sensor(s), the disclosed system and method can detect plugging of the basket assembly when field materials begin to accumulate on the bars and before appreciable amounts of field materials have begun to accumulate within the interior of the basket assembly. Such early detection of plugging allows for corrective actions to be taken before significant plugging of the basket assembly has occurred.

Figure 2:
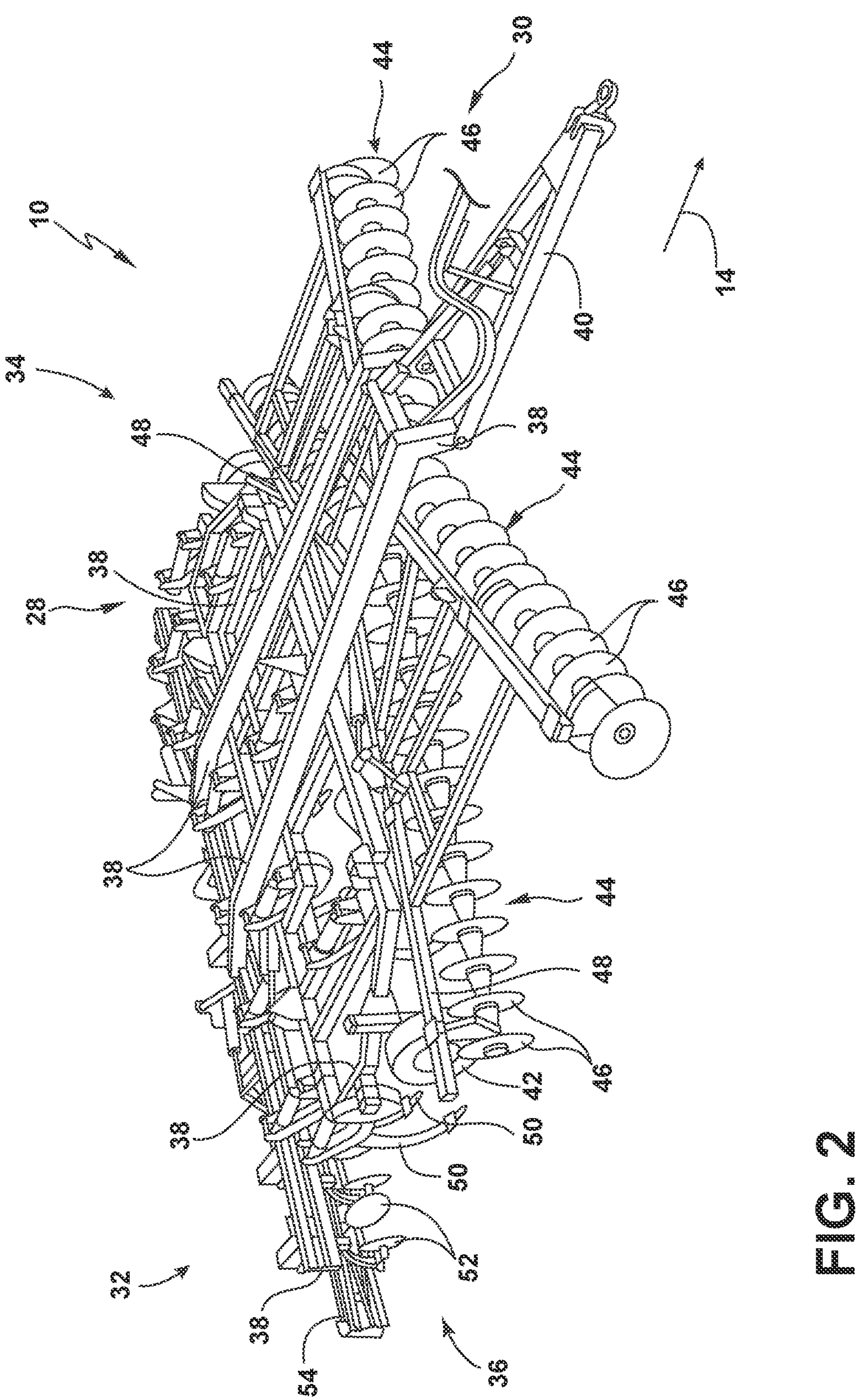
FIG. 2 illustrates another perspective view of the agricultural implement shown in FIG. 1 in accordance with aspects of the present subject matter.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 is configured as a tillage implement, and the work vehicle 12 is configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support various ground-engaging tools. For instance, the frame 28 may support one or more gangs or sets 44 of disk blades 46. Each disk blade 46 may be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Additionally, as shown, in one embodiment, the implement frame 28 may be configured to support other ground-engaging tools. For instance, in the illustrated embodiment, the frame 28 supports a plurality of shanks 50 configured to rip or otherwise till the soil as the implement 10 is towed across the field. Furthermore, in the illustrated embodiment, the frame 28 is also configured to support one or more finishing tools, such as a plurality of leveling blades 52 and/or rolling (or crumbler) basket assemblies 54. However, in other embodiments, any other suitable ground-engaging tools may be coupled to and supported by the implement frame 28, such as a plurality of closing disks.

Figure 3:
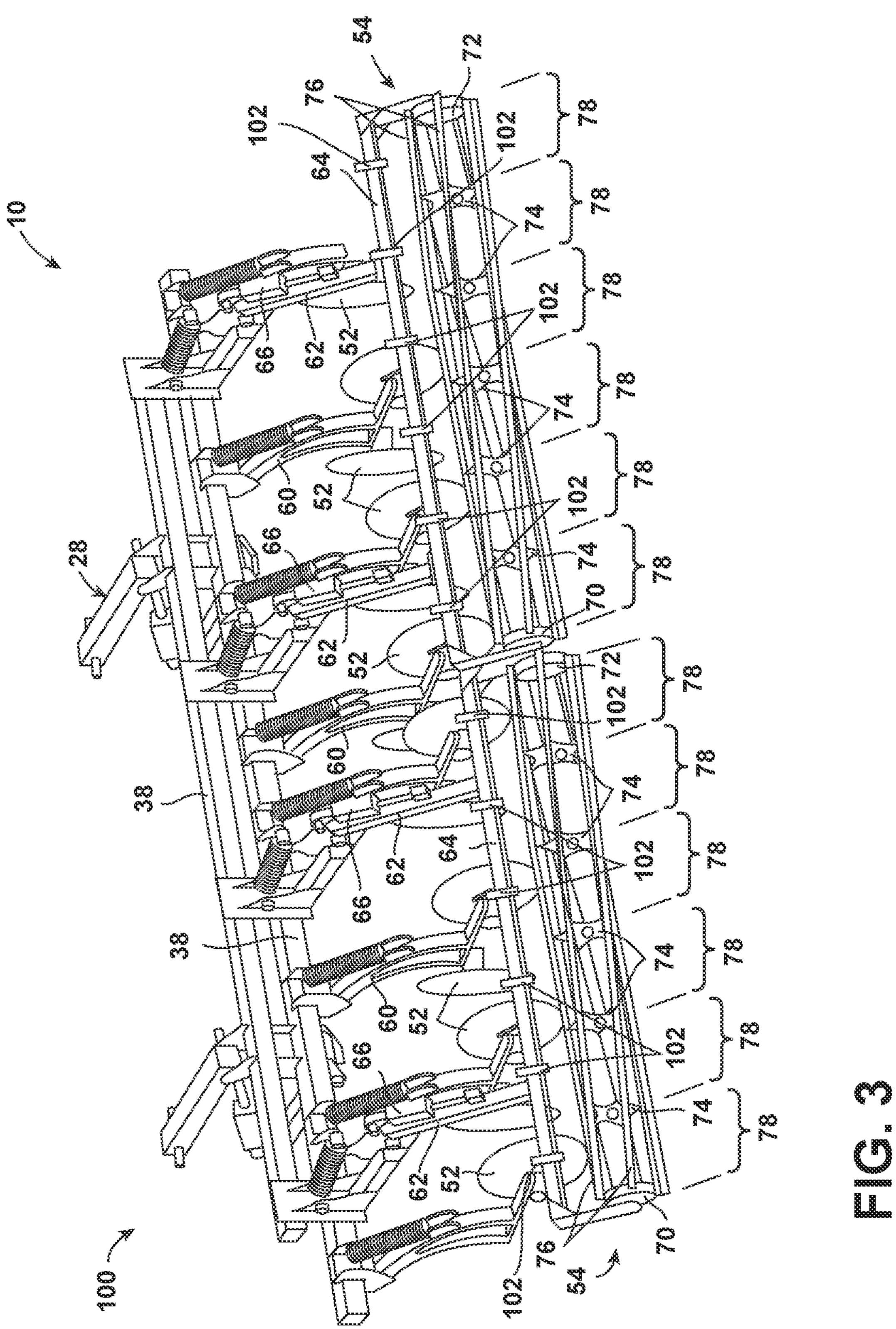
FIG. 3 illustrates a perspective view of basket assemblies positioned at an aft end of the implement shown in FIGS. 1 and 2 in accordance with aspects of the present subject matter, particularly illustrating ultrasonic sensors installed relative to the basket assemblies.

Referring now to FIG. 3, a perspective view of the aft end of the implement 10 shown in FIGS. 1 and 2 is illustrated in accordance with aspects of the present subject matter, particularly illustrating the finishing tools 52, 54 of the implement 10. As shown, the various finishing tools 52, 54 may be coupled to or supported by the implement frame 28, such as by coupling each tool to a toolbar or laterally extending frame member 38 of the frame 28. For instance, as shown in FIG. 3, a blade support arm 60 may be coupled between a given frame member 38 and each leveling blade 52 or set of leveling blades 52 to support the blades 52 relative to the frame 28. Similarly, one or more basket support arms 62 may be coupled between a given frame member 38 and an associated mounting yoke or basket hanger 64 for supporting each basket assembly 54 relative to the frame 28. Additionally, as shown in FIG. 3, in one embodiment, a basket actuator 66 (e.g., a hydraulic or pneumatic cylinder, an electric linear actuator, etc.) may be coupled to each basket support arm 62 to allow the force or pressure applied to each basket assembly 54 to be adjusted. The basket actuators 66 may also allow the basket assemblies 54 to be raised off the ground, such as when the implement 10 is making a headland turn and/or when the implement 10 is being operated within its transport mode.

In several embodiments, each basket assembly 54 includes a plurality of support plates 70, 72, 74 configured to support a plurality of blades or bars 76 spaced circumferentially about an outer perimeter of the basket. For instance, as shown in FIG. 3, each basket assembly 54 includes first and second end plates 70, 72 positioned at the opposed lateral ends of the basket assembly 54 and a plurality of inner support plates 74 spaced apart laterally from one another between the end plates 70, 72. Lateral basket sections 78 are generally defined between each pair of adjacent support plates 70, 72, 74, with each basket section 78 being generally characterized by a hollow or substantially hollow interior area surrounded by the lateral portions of the bars 76 extending between the respective pair of adjacent support plates 70, 72, 74. Moreover, the end plates 70, 72 may be rotatably coupled to the corresponding basket hanger 64 (which, in turn, is coupled to the associated bracket support arm(s) 62) via bearings to allow the basket assembly 54 to rotate relative to the hanger/arm 64, 62 as implement 10 travels across the field. Additionally, in the illustrated embodiment, the bars 76 of each basket assembly 54 are configured as formed bars. However, in other embodiments, the bars 76 may have any other suitable configuration, such as flat bars, round bars, and/or the like.

It should be further appreciated that the configuration of the agricultural implement 10 and the work vehicle 12 described above and shown in FIGS. 1-3 is provided only to place the present subject matter in an exemplary field of use. Thus, it should be appreciated that the present subject matter may be readily adaptable to any manner of agricultural and/or work vehicle configuration.

Moreover, one or more ultrasonic sensors 102 are installed or otherwise mounted on the implement 10. In general, the ultrasonic sensor(s) 102 is configured to emit ultrasonic signals directed at the basket assembly 54 and receive return signals based on reflections of the ultrasonic signals off of the basket assembly 54. Thus, the sensor(s) 102 is generally installed on the implement 10 adjacent to the basket assembly(ies) 54. As will be described below, the data generated by the ultrasonic sensor(s) 102 is used to determine when field materials have accumulated on the bars 76 such that the basket assembly(ies) 54 is becoming plugged.

In several embodiments, the ultrasonic sensor(s) 102 is generally installed on the implement 10 adjacent to the basket assembly(ies) 54. For example, in some embodiments, each ultrasonic sensor 102 may be installed relative to an adjacent basket assembly 54 such that the ultrasonic sensor 102 is configured to transmit ultrasonic signals towards the interior of the basket assembly 54 along a line of sight or line of detection 106 (FIGS. 4A, 4B, and 5) of the ultrasonic sensor 102 and subsequently receive return signals corresponding to the ultrasonic signals as reflected off one of the bars 76 aligned with the line of detection 106 at such point in time. However, as will be described below, when field materials, such as soil and/or the like, accumulate on the bars 76 during operation of the implement 10, such as when the basket assembly(ies) 54 begin to plug, the field materials absorb the emitted ultrasonic signals. In such instances, return signals are not reflected off of the bars 76 on which field materials have accumulated when such bars 76 are aligned with the line of detection 106. In this respect, by determining whether (and for how long) there is a lack of return signals being received by the ultrasonic sensor(s) 102, an associated computing system 126 (FIG. 6) communicatively coupled to each ultrasonic sensor 102 may be configured to identify the presence of material accumulation on the bars 76 of the basket assemblies 54. Such accumulations of field materials are, in turn, indicative of plugging of the basket assemblies 54. Once plugging is detected, an appropriate control action may then be executed, such as by notifying the operator of the plugged condition or by performing an automated control action.

The ultrasonic sensor(s) 102 may correspond to any suitable sensors or sensing devices configured to emit acoustic or sound wave-based signals and receive return signals based on reflections of the acoustic or sound wave-based signals off of the basket assembly(ies) 54.

As shown in FIG. 3, the ultrasonic sensors 102 are mounted to the basket hanger 64 supporting each basket assembly 54 relative to the implement frame 28 (e.g., via the associated basket support arm 62) in a manner such that each ultrasonic sensor 102 has a downwardly oriented line of sight or line of detection 106 (FIGS. 4A, 4B, and 5) directed towards the interior of the adjacent basket assembly 54. Specifically, in the illustrated embodiment, the ultrasonic sensors 102 are spaced apart laterally across each basket hanger 64 such that at least one ultrasonic sensor 102 has a downwardly oriented line of detection 106 directed towards the interior of each lateral basket section 78 of the adjacent basket assembly 54. As a result, the ultrasonic sensors 102 may allow the material accumulation on the bars 76 of each respective basket section 78 to be individually monitored. However, in other embodiments, the ultrasonic sensors 102 may be mounted at any other suitable location relative to the basket assembly 54 that allows each sensor 102 to have a line of detection directed towards the interior of an associated basket assembly 54. Additionally, although the illustrated embodiment shows a specific number of ultrasonic sensors 102 installed relative to each basket assembly 54 (e.g., one per each lateral basket section 78), the implement 10 may generally include any suitable number of ultrasonic sensors 102, including a single ultrasonic sensor 102 for each basket assembly 54.

Referring now to FIGS. 4A, 4B, and 5, schematic, simplified cross-sectional views of one of the basket assemblies 54 shown in FIG. 3 are illustrated in accordance with aspects of the present subject matter. Specifically, FIGS. 4A and 4B illustrate the basket assembly 54 when the bars 76 are completely devoid of material accumulation. Additionally, FIG. 5 illustrates the basket assembly 54 when field materials (indicated by masses 116) have accumulated on its bars 76.

As shown, the ultrasonic sensor 102 is coupled to the adjacent basket hanger 64 (e.g., via a mounting bracket 104) such that the ultrasonic sensor 102 has a line of detection 106 oriented towards the interior of the basket assembly 54. Specifically, in the illustrated embodiment, the line of detection 106 of the ultrasonic sensor 102 is directed towards a center 108 of the basket assembly 54, which may also correspond to the location of the rotational axis of the basket assembly 54. However, in other embodiments, the line of detection 106 of the ultrasonic sensor 102 may be directed towards any other location(s) within the interior of the basket assembly 54, such as any off-center location.

As particularly shown in FIGS. 4A and 4B, as the basket assembly 54 devoid of material build-up rotates in a given rotational direction (e.g., as indicated by arrow 110) across the ground (and relative to the sensor 102) during the performance of an agricultural operation (e.g., a tillage operation), the line of detection 106 of the ultrasonic sensor 102 alternates from being aligned with one of the bars 76 of the basket assembly 54 to being aligned with the open area or gap defined adjacent bars 76. For example, in the snapshot shown in FIG. 4A, the line of detection 106 is aligned with one of the bars 76 of the basket assembly 54. As a result, the ultrasonic signals (indicated by arrow 112) emitted from the ultrasonic sensor 102 reflect off the outer surface of the aligned bar 76 and be directed back to the ultrasonic sensor 102 as return signals (indicated by arrow 114). In contrast, in the subsequent snapshot shown in FIG. 4B in which the basket assembly 54 has rotated slightly in the rotational direction 110 from the position shown in FIG. 4A, the line of detection 106 is aligned with the open space defined between adjacent bars 76 of the basket assembly 54. As a result, the ultrasonic signals 112 emitted from the ultrasonic sensor 102 pass between the adjacent bars 76 and through the open interior of the basket assembly 54 to the basket center 108 or beyond. As the basket assembly 54 is further rotated in the rotational direction 110 from the position shown in FIG. 4B, the next adjacent bar 76 will pass through the line of detection 106 of the ultrasonic sensor 102, thereby allowing the sensor 102 to detect the bar. Such alternating pattern will be repeated as the basket assembly 54 rotates relative to the ultrasonic sensor 102 during operation of the agricultural implement 10.

In the illustrated embodiment, the detection range of the ultrasonic sensor 102 has generally been selected to generally correspond to the distance defined between the ultrasonic sensor 102 and the basket center 108. As a result, the ultrasonic sensor 102 will not receive return signals 114 when the line of detection 106 for the sensor 102 is aligned with the open space between adjacent bars 76 (e.g., as shown in FIG. 4B), thereby indicating that the ultrasonic signals 112 reached the center 108 of the basket assembly 54. Thus, when little to no field material has accumulated on the bars 76 of the basket assembly 54, the ultrasonic sensor 102 will alternatingly receive and not receive the return signals 114 based on the distance between the bars 76 and the speed at which the basket assembly 54 is rotating. In other embodiments, the ultrasonic sensor 102 may have any other suitable detection range.

However, when the field materials 116 have accumulated on the bars 76 of the basket assembly 54, the same alternating pattern will not be present as the basket assembly 54 rotates relative to the ultrasonic sensor 102 during operation of the agricultural implement 10. For instance, the line of detection 106 of the ultrasonic sensor 102 is aligned with one of the bars 76 of the basket assembly 54 on which the field materials 116 have accumulated in the snapshot shown in FIG. 5. As mentioned above, the field materials 116 that have accumulated on the bars 76 absorb the ultrasonic signals 112 emitted by the ultrasonic sensor 102. In such instances, the ultrasonic signals 112 emitted from the ultrasonic sensor 102 are not reflected off the field materials 116 such that no return signals are directed back to the ultrasonic sensor 102. Thus, unlike the non-plugged state described above with reference to FIGS. 4A and 4B, when the basket assembly 54 is plugged, there will be a continuous lack of return signals being received by the ultrasonic sensor 102 for an extended period of time (e.g., a time period longer than it takes for the line of detection 106 of the ultrasonic sensor 102 to pass through the open area or gap defined adjacent bars 76).

Figure 6:
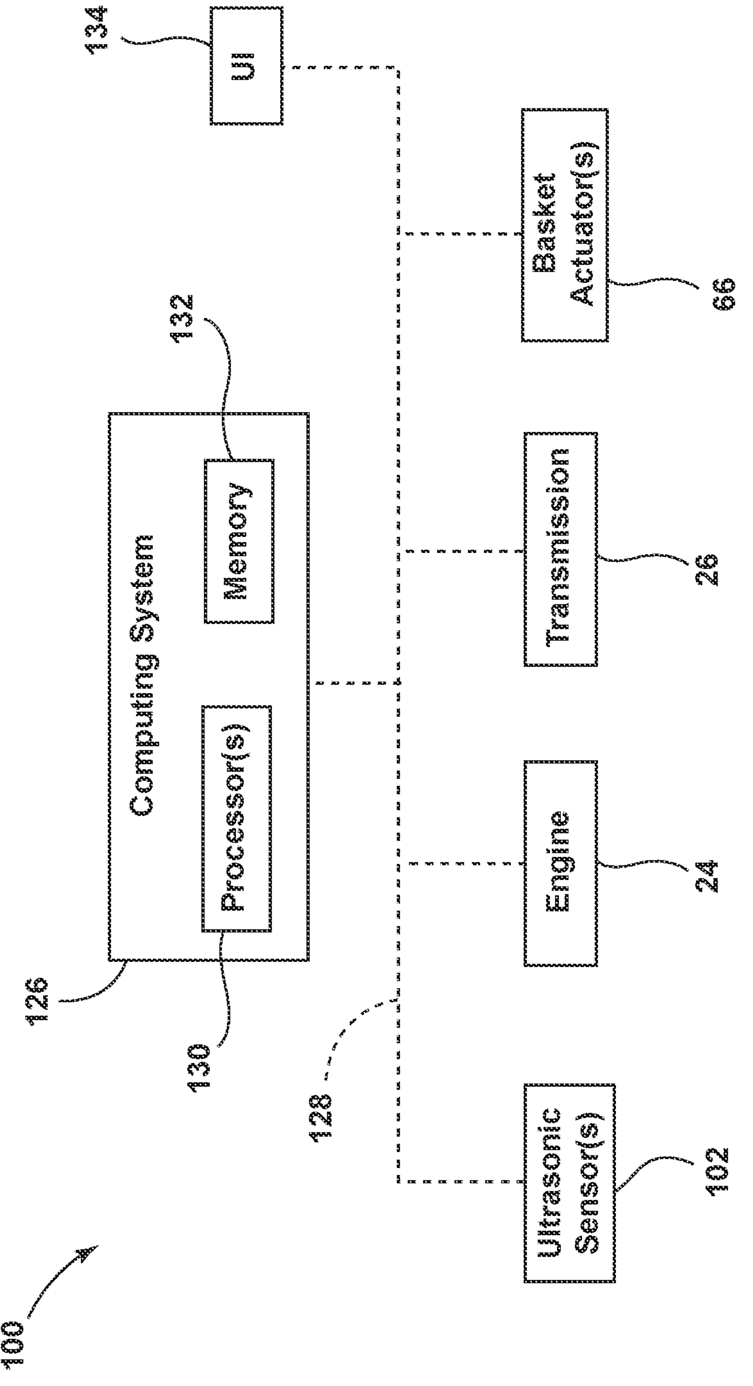
FIG. 6 illustrates a schematic view of one embodiment of a system for monitoring plugging of a basket assembly of an agricultural implement in accordance with aspects of the present subject matter.

Referring now to FIG. 6, a schematic view of one embodiment of a system 100 for monitoring plugging of a basket assembly of an agricultural implement is illustrated in accordance with aspects of the present subject matter. In general, the system 100 will be described herein with reference to the agricultural implement 10 and the work vehicle 12 described above with reference to FIGS. 1-5. However, it should be appreciated by those of ordinary skill in the art that the disclosed system 100 may generally be utilized with agricultural implements having any other suitable implement configuration and/or work vehicles having any other suitable vehicle configuration.

As shown in FIG. 6, the system 100 includes a computing system 126 communicatively coupled to one or more components of the agricultural implement 10, the work vehicle 12, and/or the system 100 to allow the operation of such components to be electronically or automatically controlled by the computing system 126. For instance, the computing system 126 may be communicatively coupled to the ultrasonic sensor(s) 102 via a communicative link 128. As such, the computing system 126 may be configured to receive data from the ultrasonic sensor(s) 102 that is indicative whether the ultrasonic sensor(s) 102 is receiving return signals. Furthermore, the computing system 126 may be communicatively coupled to the engine 24, the transmission 26, and the basket actuator(s) 66 via the communicative link 128. In this respect, the computing system 126 may be configured to control the operation of the engine 24, the transmission 26, and/or the basket actuator(s) 66 to adjust the operation of the implement 10 and/or the vehicle 12 in a manner that facilitates de-plugging of the basket assemblies 54. In addition, the computing system 126 may be communicatively coupled to any other suitable components of the agricultural implement 10, the work vehicle 12, and/or the system 100.

In general, the computing system 126 may comprise one or more processor-based devices, such as a given controller or computing device or any suitable combination of controllers or computing devices. Thus, in several embodiments, the computing system 126 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 132 of the computing system 126 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 132 may generally be configured to store suitable computer-readable instructions that, when implemented by the processor(s) 130, configure the computing system 126 to perform various computer-implemented functions, such as one or more aspects of the methods and algorithms that will be described herein. In addition, the computing system 126 may also include various other suitable components, such as a communications circuit or module, one or more input/output channels, a data/control bus and/or the like.

The various functions of the computing system 126 may be performed by a single processor-based device or may be distributed across any number of processor-based devices, in which instance such devices may be considered to form part of the computing system 126. For instance, the functions of the computing system 126 may be distributed across multiple application-specific controllers or computing devices, such as a navigation controller, an engine controller, a transmission controller, an implement controller, and/or the like.

In addition, the system 100 may also include a user interface 134. More specifically, the user interface 134 may be configured to provide feedback from the computing system 126 (e.g., feedback associated with plugging of the basket assemblies 54) to the operator. As such, the user interface 134 may include one or more feedback devices (not shown), such as display screens, speakers, warning lights, and/or the like, which are configured to provide feedback from the computing system 126 to the operator. As such, the user interface 134 may, in turn, be communicatively coupled to the computing system 126 via the communicative link 128 to permit the feedback to be transmitted from the computing system 126 to the user interface 134. Furthermore, some embodiments of the user interface 134 may include one or more input devices, such as touchscreens, keypads, touchpads, knobs, buttons, sliders, switches, mice, microphones, and/or the like, which are configured to receive inputs from the operator. In one embodiment, the user interface 134 may be mounted or otherwise positioned within the cab 22 of the work vehicle 12. However, in alternative embodiments, the user interface 134 may mounted at any other suitable location.

Figure 7:
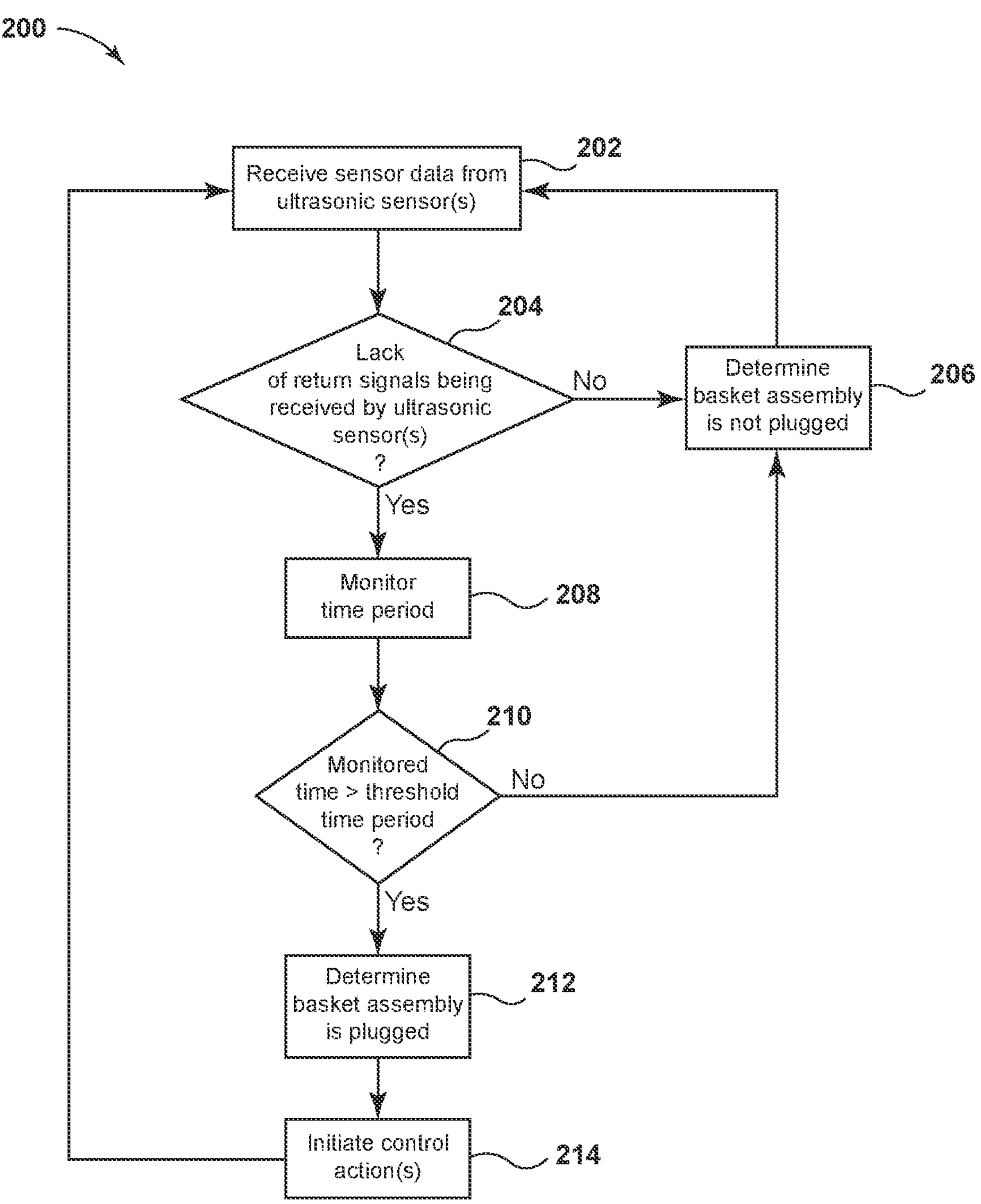
FIG. 7 illustrates a flow diagram providing one embodiment of control logic for monitoring plugging of a basket assembly of an agricultural implement in accordance with aspects of the present subject matter.

Referring now to FIG. 7, a flow diagram of one embodiment of example control logic 200 that may be executed by the computing system 126 (or any other suitable computing system) for monitoring plugging of a basket assembly of an agricultural implement is illustrated in accordance with aspects of the present subject matter. Specifically, the control logic 200 shown in FIG. 7 is representative of steps of one embodiment of an algorithm that can be executed to detect plugging of a basket assembly of an agricultural implement before appreciable amounts of field materials begin to accumulate within the interior of the basket assembly. Thus, in several embodiments, the control logic 200 may be advantageously utilized in association with a system installed on or forming part of an agricultural implement and/or an associated work vehicle to allow for real-time monitoring plugging of a basket assembly of an agricultural implement without requiring substantial computing resources and/or processing time. However, in other embodiments, the control logic 200 may be used in association with any other suitable system, application, and/or the like for monitoring plugging of a basket assembly of an agricultural implement.

As shown, at (202), the control logic 200 includes receiving sensor data from one or more ultrasonic sensor(s) supported on an agricultural implement. Specifically, as mentioned above, in several embodiments, the computing system 126 may be communicatively coupled to the ultrasonic sensor(s) 102 supported on the agricultural implement 10 via the communicative link 128. As described above, the ultrasonic sensor(s) 102 is configured to emit ultrasonic signals directed at the basket assembly(ies) 54 of the implement 10 and receive return signals based on reflections of the ultrasonic signals off of the basket assembly(ies) 54. In this respect, as the implement/vehicle 10/12 travels across the field to perform an operation (e.g., a tillage operation) thereon, the computing system 126 may receive data from the ultrasonic sensor(s) 102. Such data may, in turn, be indicative of whether the ultrasonic sensor(s) 102 is receiving the return signals.

Furthermore, at (204), the control logic 200 includes determining when a lack of return signals being received by the ultrasonic sensor(s) occurs. Specifically, in several embodiments, the computing system 126 is configured to analyze the sensor data received at (202) to determine whether the ultrasonic sensor(s) 102 is receiving the return signals. As will be described below, the computing system 126 is configured to determine when the basket assembly (ies) 54 is plugged based on the return signals being received by the ultrasonic sensor(s) 102 and/or a lack of return signals being received by the ultrasonic sensor(s) 102. For example, the computing system 126 may determine that the basket assembly(ies) 54 is plugged when such a lack of return signals being received by the ultrasonic sensor(s) 102 occurs.

More specifically, in some embodiments, when the computing system 126 determines that a given ultrasonic sensor 102 is receiving return signals, the ultrasonic signals emitted by the given sensor 102 are being reflected off of one of the bars 76 of the corresponding section 78 of the basket assembly 54. In such instances, the control logic 200 proceeds to (206) at which the computing system 126 determines that the corresponding section 78 of the basket assembly 54 is not plugged. Upon completion of (206), the control logic 200 returns (202) (at least with respect to that section 78 of the basket assembly 54).

Conversely, when the computing system 126 determines that there is a lack of return signals being received by a given ultrasonic sensor 102, the ultrasonic signals emitted by the given sensor 102 are not being reflected off of one of the bars 76 of the corresponding section 78 of the basket assembly 54. For example, the line of detection 106 for the given sensor 102 may be aligned with the open space between an adjacent pair of the bars 76. Alternatively, the ultrasonic signals emitted by the given sensor 102 may be absorbed by field materials that have accumulated on the bars 76 of the corresponding section 78 of the basket assembly 54. In such instances, the control logic 200 proceeds to (208) (at least with respect to that section 78 of the basket assembly 54).

Additionally, at (208), the control logic 200 includes monitoring the time period across which there is a lack of return signals being received by the ultrasonic sensor(s). Specifically, in several embodiments, when it is determined at (204) that there is a lack of return signals being received by the ultrasonic sensor(s) 102 is occurring, the computing system 126 is configured to monitor or otherwise determine the time period across which such a lack of return signals being received by the ultrasonic sensor(s) 102 exists.

Moreover, at (210), the control logic 200 includes comparing the monitored time period across which there is a lack of return signals being received by the ultrasonic sensor(s) to a threshold time period. Specifically, in several embodiments, the computing system 126 is configured to compare the monitored time period across which there is a lack of return signals being received by the ultrasonic sensor(s) 102 determined at (208) to a threshold time period. When the monitored time period is equal to or less than the threshold time period, the lack of return signals being received by a given ultrasonic sensor 102 may be caused by alignment of the line of detection 106 for the given sensor 102 with the open space between adjacent bars 76 of the basket assembly 54. In such instances, the control logic 200 returns to (206) at the computing system 126 determines that the corresponding section 78 of the basket assembly 54 is not plugged. Conversely, when the monitored time period exceeds the threshold time period, the lack of return signals being received by the given ultrasonic sensor 102 may be caused by absorption of the ultrasonic signals emitted by the given sensor 102 by field materials that have accumulated on the bars 76 of the corresponding section 78 of the basket assembly 54. In such instances, the control logic 200 proceeds to (212) at which the computing system 126 determines that the corresponding section 78 of the basket assembly 54 is not plugged. Thereafter, the control logic 200 proceeds to (214) (at least with respect to that section 78 of the basket assembly 54).

In some embodiments, the threshold time period may be adjustable, such as based on one or more operating parameters of the agricultural implement 10. For example, as indicated above, the threshold time period may be set to correspond to the time that elapses as the line of detection 106 for the an ultrasonic sensor 102 moves across the open space between adjacent bars 76 when the basket assembly 54 rotates. Thus, when the rotational speed of the basket assembly 54 increases, the time that elapses as the line of detection 106 moves across the open space between adjacent bars 76 decreases. Conversely, when the rotational speed of the basket assembly 54 decreases, the time that elapses as the line of detection 106 moves across the open space between adjacent bars 76 increases. As such, in one embodiment, the computing system 126 may adjust or set the threshold time period dynamically at least based in part on the ground speed of the implement/vehicle 10/12. However, in alternative embodiments, the threshold time period may be a static or fixed value.

Furthermore, at (214), the control logic 200 includes initiating a control action associated with de-plugging the basket assembly. Specifically, in several embodiments, the computing system 126 may be configured to initiate one or more control actions associated with de-plugging the basket assembly(ies) 54 when it is determined at (212) that one or more sections 78 of the basket assembly(ies) 54 are plugged. For example, in one embodiment, the control action(s) include providing a notification to an operator of the agricultural implement 10 that one or more sections 78 of the basket assembly (ies) 54 are plugged. In such an embodiment, the computing system 126 may transmit suitable control signals to the user interface 134 instructing the user interface 134 to provide the appropriate notification to the operator.

Alternatively, or additionally, the control action(s) include adjusting an operating parameter(s) of the implement 10 and/or the vehicle 12. For example, in one embodiment, the control action(s) may include adjusting (e.g., increasing and/or decreasing) the ground speed of the implement/vehicle 10/12. In such an embodiment, the computing system 126 may transmit suitable control signals to the engine 24 and/or transmission 26 of the vehicle 12 instructing the engine 24 and/or transmission 26 to adjust (e.g., increase) the ground speed of the implement/vehicle 10/12. In a further embodiment, the control action(s) include adjusting the force being of the basket assembly (ies) 54 by the basket actuator(s) 66. In such an embodiment, the computing system 126 may transmit suitable control signals to the basket actuator(s) 66 of the implement 10 instructing the basket actuator(s) 66 to adjust force being applied to the basket assembly (ies) 54.

Figure 8:
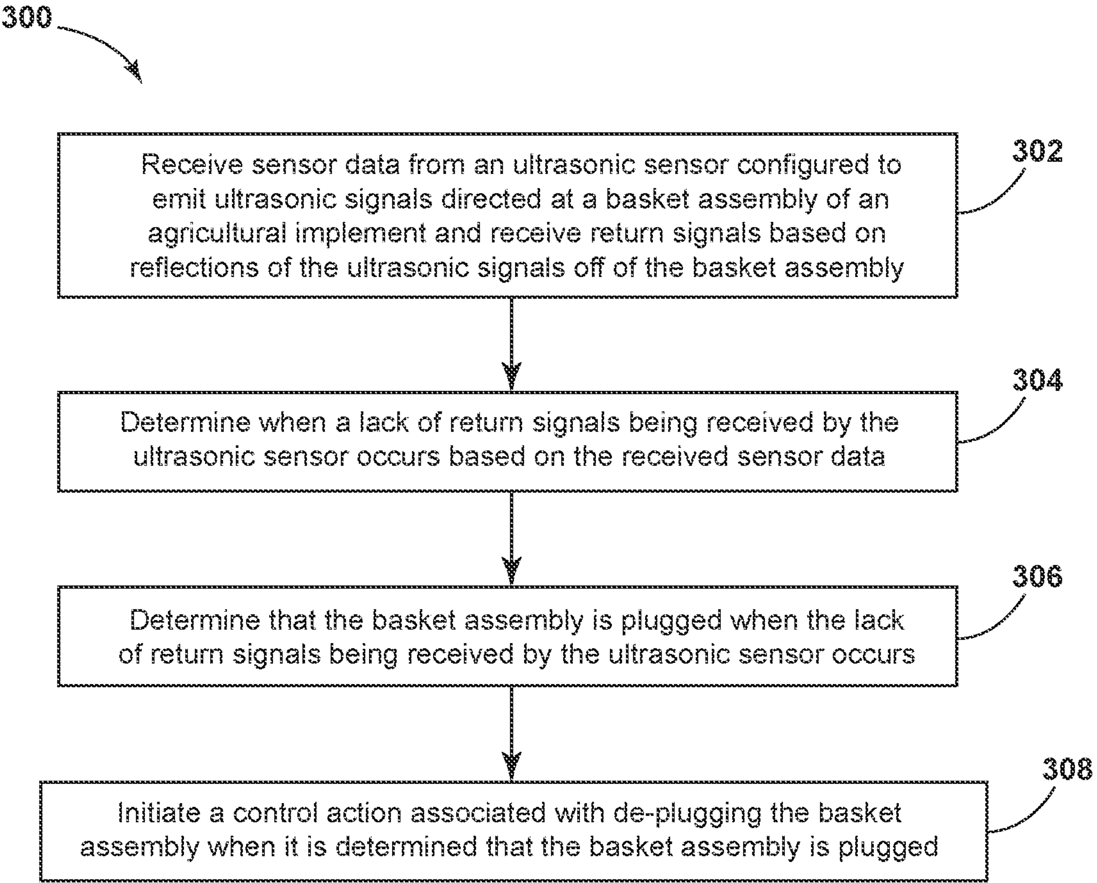
FIG. 8 illustrates a flow diagram of one embodiment of a method for monitoring plugging of a basket assembly of an agricultural implement in accordance with aspects of the present subject matter.

Referring now to FIG. 8, a flow diagram of one embodiment of a method 300 for monitoring plugging of a basket assembly of an agricultural implement is illustrated in accordance with aspects of the present subject matter. In general, the method 300 will be described herein with reference to the agricultural implement 10, the work vehicle 12, and the system 100 described above with reference to FIGS. 1-7. However, it should be appreciated by those of ordinary skill in the art that the disclosed method 300 may generally be implemented with any agricultural implement having any suitable implement configuration, any work vehicle having any suitable vehicle configuration, and/or within any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 includes receiving, a computing system, sensor data from an ultrasonic sensor configured to emit ultrasonic signals directed at a basket assembly of an agricultural implement and receive return signals based on reflections of the ultrasonic signals off of the basket assembly. For instance, as described above, the computing system 126 may be configured to receive sensor data from the ultrasonic sensor(s) 102 via the communication link 128. The ultrasonic sensor(s) 102, in turn, is configured to emit ultrasonic signals directed at the basket assembly(ies) 54 of the agricultural implement 10 and receive return signals based on reflections of the ultrasonic signals off of the basket assembly(ies) 54.

Furthermore, at (304), the method 300 includes determining, with the computing system, when a lack of return signals being received by the ultrasonic sensor occurs based on the received sensor data. For instance, as described above, the computing system 126 may be configured to determine when a lack of return signals being received by the ultrasonic sensor(s) 102 occurs based on the received sensor data.

Additionally, at (306), the method 300 includes determining, with the computing system, that the basket assembly is plugged when the lack of return signals being received by the ultrasonic sensor occurs. For instance, as described above, the computing system 126 may be configured to determine that the basket assembly(ies) 54 is plugged when the lack of return signals being received by the ultrasonic sensor(s) 102 occurs.

Moreover, at (308), the method 300 includes initiating, with the computing system, a control action associated with de-plugging the basket assembly when it is determined that the basket assembly is plugged. For instance, as described above, the computing system 126 may be configured to initiate one or more control actions associated with de-plugging the basket assembly(ies) 54 when it is determined that the basket assembly(ies) 54 is plugged. Such control actions may include adjusting the ground speed of the implement/vehicle 10/12 and/or adjusting the force being applied to the basket assemblies 54 by the basket actuators 66.

It is to be understood that the steps of the control logic 200 and the method 300 are performed by the computing system 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 126 described herein, such as the control logic 200 and the method 300, is implemented in software code or instructions which are tangibly stored on a tangible computer readable medium. The computing system 126 loads the software code or instructions via a direct interface with the computer readable medium or via a wired and/or wireless network. Upon loading and executing such software code or instructions by the computing system 126, the computing system 126 may perform any of the functionality of the computing system 126 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
- a frame;
- a basket assembly supported on the frame such that the basket assembly is configured to roll relative to a surface of a field as the agricultural implement travels across the field, the basket assembly including a plurality of bars spaced circumferentially about an outer perimeter of the basket assembly;
- an ultrasonic sensor configured to emit ultrasonic signals directed at the basket assembly and receive return signals based on reflections of the ultrasonic signals off of the basket assembly; and
- a computing system communicatively coupled to the ultrasonic sensor, the computing system configured to determine when the basket assembly is plugged based on a lack of return signals being received by the ultrasonic sensor, wherein the computing system is further configured to:
  - determine when the lack of return signals being received by the ultrasonic sensor occurs;
  - monitor a time period across which the lack of return signals being received by the ultrasonic sensor occurs;
  - compare the monitored time period to a threshold time period; and
  - determine that the basket assembly is plugged when the monitored time period exceeds the threshold time period.

2. The agricultural implement of claim 1, wherein the computing system is further configured to initiate a control action associated with de-plugging the basket assembly when it is determined that the basket assembly is plugged.

3. A system for monitoring basket plugging of an agricultural implement, the system comprising:
- a basket assembly configured to roll relative to a surface of a field as the agricultural implement travels across the field, the basket assembly including a plurality of bars spaced circumferentially about an outer perimeter of the basket assembly;

an ultrasonic sensor configured to emit ultrasonic signals directed at the basket assembly and receive return signals based on reflections of the ultrasonic signals off of the basket assembly; and a computing system communicatively coupled to the ultrasonic sensor, the computing system configured to determine when the basket assembly is plugged based on a lack of return signals being received by the ultrasonic sensor, wherein the computing system is further configured to:

determine when the lack of return signals being received by the ultrasonic sensor occurs;

monitor a time period across which the lack of return signals being received by the ultrasonic sensor occurs;

compare the monitored time period to a threshold time period; and determine that the basket assembly is plugged when the monitored time period exceeds the threshold time period.

4. The system of claim 3, wherein the threshold time period is adjustable.

5. The system of claim 4, wherein the threshold time period is adjustable based at least in part on a ground speed of the agricultural implement.

6. The system of claim 3, wherein the computing system is further configured to initiate a control action associated with de-plugging the basket assembly when it is determined that the basket assembly is plugged.

7. The system of claim 6, wherein the control action comprises providing a notification to an operator of the agricultural implement that the basket assembly is plugged.

8. The system of claim 6, wherein the control action comprises adjusting a ground speed of the agricultural implement.

9. The system of claim 6, wherein the control action comprises adjusting a force being applied to the basket assembly.

10. A method for monitoring basket plugging of an agricultural implement, the agricultural implement including a basket assembly configured to roll relative to a surface of a field as the agricultural implement travels across the field, the basket assembly including a plurality of bars spaced circumferentially about an outer perimeter of the basket assembly, the method comprising:

receiving, with a computing system, sensor data from an ultrasonic sensor configured to emit ultrasonic signals directed at the basket assembly and receive return signals based on reflections of the ultrasonic signals off of the basket assembly;

determining, with the computing system, when a lack of return signals being received by the ultrasonic sensor occurs based on the received sensor data;

determining, with the computing system, that the basket assembly is plugged when the lack of return signals being received by the ultrasonic sensor occurs, wherein determining that the basket assembly is plugged comprises:

monitoring, with the computing system, a time period across which the lack of return signals being received by the ultrasonic sensor occurs;

comparing, with the computing system, the monitored time period to a threshold time period; and determining, with the computing system, that the basket assembly is plugged when the monitored time period exceeds the threshold time period; and initiating, with the computing system, a control action associated with de-plugging the basket assembly when it is determined that the basket assembly is plugged.

11. The method of claim 10, wherein the control action comprises providing a notification to an operator of the agricultural implement that the basket assembly is plugged.

12. The method of claim 10, wherein the control action comprises adjusting a ground speed of the agricultural implement.

13. The method of claim 10, wherein the control action comprises adjusting a force being applied to the basket assembly.

* * * * *